(12) United States Patent
Gibson et al.

(10) Patent No.: US 12,464,358 B2
(45) Date of Patent: Nov. 4, 2025

(54) GLOBAL MOBILE COMMUNICATION EVENT IDS FOR IMPROVED NETWORK AND SECURITY OPERATIONS

(71) Applicant: T-Mobile USA, Inc., Bellevue, WA (US)

(72) Inventors: Geoffrey Todd Gibson, Rowlett, TX (US); Marouane Balmakhtar, Fairfax, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 222 days.

(21) Appl. No.: 18/482,819

(22) Filed: Oct. 6, 2023

(65) Prior Publication Data

US 2025/0119746 A1    Apr. 10, 2025

(51) Int. Cl.
*H04W 12/122* (2021.01)

(52) U.S. Cl.
CPC ............................ *H04W 12/122* (2021.01)

(58) Field of Classification Search
CPC .................................................. H04W 12/122
See application file for complete search history.

(56) References Cited

U.S. PATENT DOCUMENTS

| | | | |
|---|---|---|---|
| 11,005,860 B1 * | 5/2021 | Glyer | H04L 41/064 |
| 11,188,397 B2 * | 11/2021 | Cristofi | G06F 21/55 |
| 11,232,437 B2 * | 1/2022 | Laracey | G06Q 20/4014 |
| 11,887,105 B2 * | 1/2024 | Laracey | G06Q 30/06 |
| 12,003,956 B2 * | 6/2024 | Naujok | H04L 63/1425 |
| 12,019,782 B1 * | 6/2024 | Oliver | H04L 63/1425 |
| 2023/0315884 A1 * | 10/2023 | Pham | G06F 21/6254 |
| | | | 726/27 |
| 2023/0388352 A1 * | 11/2023 | Gilad | H04L 63/1416 |
| 2024/0039929 A1 * | 2/2024 | Pisha | H04L 63/1416 |
| 2025/0063064 A1 * | 2/2025 | Schaaf | H04L 51/08 |

* cited by examiner

*Primary Examiner* — Viral S Lakhia
(74) *Attorney, Agent, or Firm* — Foley IP Law, PLLC

(57) ABSTRACT

Global mobile communication event identifiers (IDs) improve security by enabling early detection of cybersecurity events in cellular networks. The event IDs are each unique to a category of mobile communication events and consistent across the network functions (NF), even from different vendors. NFs assign event IDs to mobile communication events, which are reported to a cybersecurity operations center. The cybersecurity operations center has visibility into network-wide events and is thus able to match occurrences of event IDs with categorized attacks, when an attack is occurring. This enables rapid, intelligent selection of a defensive response.

17 Claims, 8 Drawing Sheets

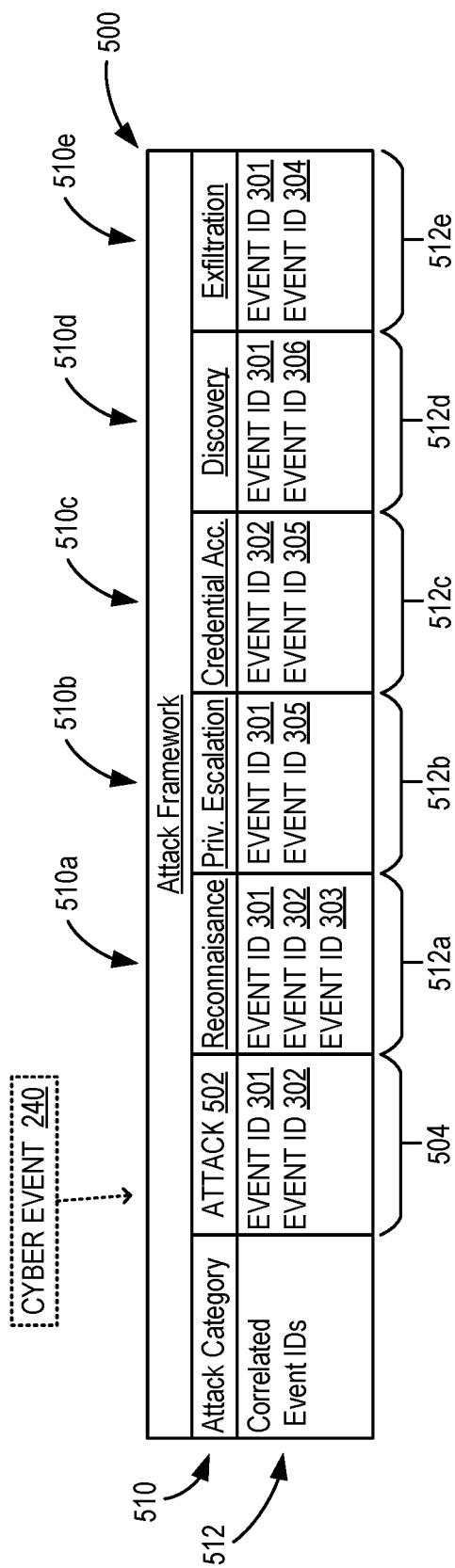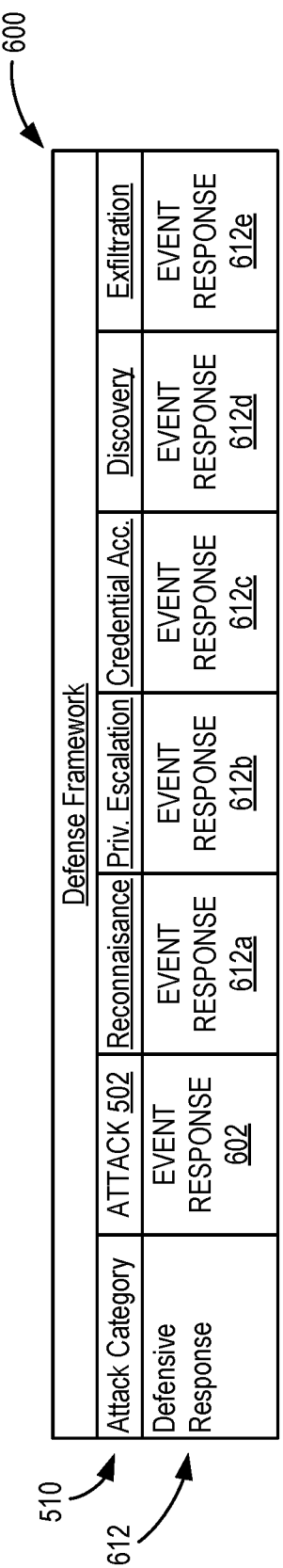
FIG. 5
FIG. 6

GLOBAL MOBILE COMMUNICATION EVENT IDS FOR IMPROVED NETWORK AND SECURITY OPERATIONS

BACKGROUND

Currently, mobile communication event identifiers (IDs) s are non-standardized, and each network function (NF) vendor has its own proprietary set of event ID information associated with various control plane and user plane events. Third Generation Partnership Project (3GPP) technical standards (TSs) govern the performance requirements and interfaces of cellular NFs to ensure interoperability. However, internal operations for achieving the specified performance requirements may be proprietary. The proprietary nature can include specific algorithms, optimizations, and technologies that vendors use to differentiate their products.

For example, a user equipment (UE) initiated detach event uses a specified message format and content, but internal event logs at the NFs, such as an access mobility function (AMF) or a mobility management entity (MME), may be recorded using a proprietary event ID. This frustrates visibility into and a comprehensive view of mobile communication events at the application layer (NF layer) than could be used to identify cybersecurity events.

In the realm of personal computers (PCs) and computer networking, an ATT&CK (attack) framework correlates events at an operating system (OS) level to categorize attacks (e.g., cyber attacks), and the FiGHT framework is built upon the ATT&CK framework and a knowledge base of adversarial attack techniques and tactics for 5G systems. However, there is no equivalent or means to correlate cellular system application layer events and/or categorize attacks.

SUMMARY

The following summary is provided to illustrate examples disclosed herein, but is not meant to limit all examples to any particular configuration or sequence of operations.

Solutions are disclosed that provide global mobile communication event identifiers (IDs) for improved network and security operations. Examples include: assigning, by a first network function (NF) of a wireless network, to a first mobile communication event, a first event identifier (ID) of a first set of event IDs, each event ID within the first set of event IDs being unique to a category of mobile communication events and consistent across NFs of the wireless network; recording, within a first event log at the first NF, a first log entry indicating an occurrence of the first mobile communication event, the first log entry comprising the first event ID and a timestamp; assigning, by a second NF of the wireless network, to a second mobile communication event, the first event ID, wherein the first mobile communication event and the second mobile communication event are within a common category of mobile communication events, and wherein the first NF and the second NF execute different proprietary software; recording, within a second event log at the second NF, a second log entry indicating an occurrence of the second mobile communication event, the second log entry comprising the first event ID and a timestamp; transmitting the first log entry and the second log entry to a cybersecurity operations center; based on at least the first event ID and/or the second event ID, determining an occurrence of a cybersecurity event; and based on at least determining the cybersecurity event, generating an alert.

Further examples include: assigning, by a first NF of a wireless network, to a first mobile communication event, a first event ID of a first set of event IDs, each event ID within the first set of event IDs being unique to a category of mobile communication events and consistent across NFs of the wireless network; recording, within a first event log at the first NF, a first log entry indicating an occurrence of the first mobile communication event, the first log entry comprising the first event ID and a timestamp; assigning, by the first NF, to a second mobile communication event, a second event ID of the first set of event IDs, the second event ID different than the first event ID; recording, within the first event log, a second log entry indicating an occurrence of the second mobile communication event, the second log entry comprising the second event ID and a timestamp; transmitting the first log entry and the second log entry to a cybersecurity operations center; correlating a second set of event IDs with a categorized attack of a set of categorized attacks, the second set of event IDs including the first event ID and a second event ID; based on at least the first event ID and the second event ID, determining an occurrence of the categorized attack; and based on at least determining the occurrence of the categorized attack, generating an alert.

BRIEF DESCRIPTION OF THE DRAWINGS

The disclosed examples are described below with reference to the accompanying drawing figures listed below, wherein:

FIG. 5 illustrates an attack framework, as may be used in examples of the architecture of FIG. 1;

FIG. 6 illustrates a defense framework, as may be used in examples of the architecture of FIG. 1;

Figure 1:
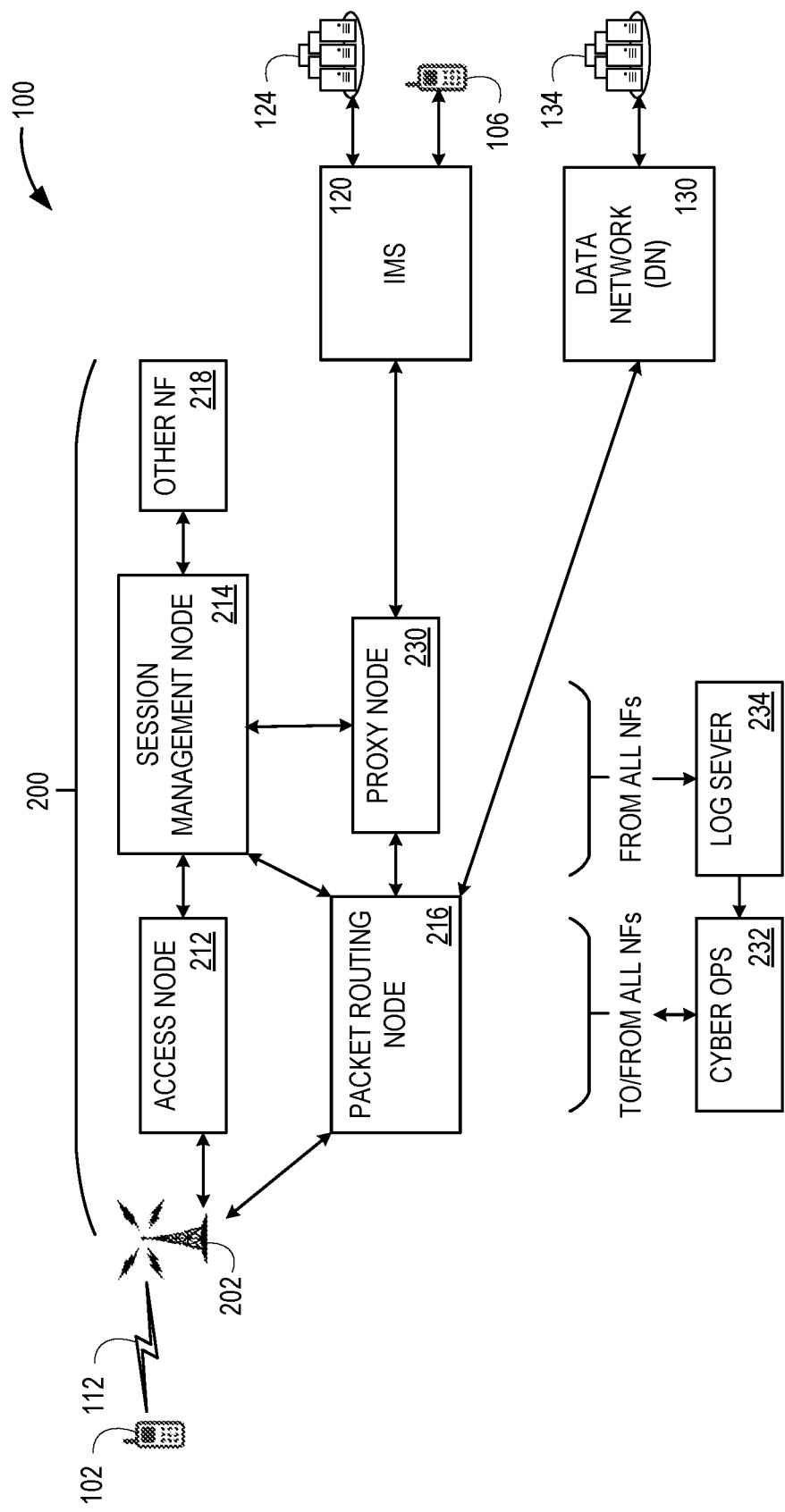
FIG. 1 illustrates an exemplary architecture that advantageously provides global mobile communication event identifiers (IDs) for improved network and security operations.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Global mobile communication event identifiers (IDs) improve security by enabling early detection of cybersecurity events in cellular networks. The event IDs are each unique to a category of mobile communication events and consistent across the network functions (NFs) and virtualized NFs (VNFs), even from different vendors. NFs assign event IDs to mobile communication events, which are reported to a cybersecurity operations center. The cybersecurity operations center has visibility into network-wide events and is thus able to match occurrences of event IDs with categorized attacks, when an attack is occurring. This enables rapid, intelligent selection of a defensive response.

Standardizing event IDs for the mobile communication NFs (including virtual NFs) involves establishing a consistent and uniform numbering system to identify specific events across NF types from various vendors for logging, auditing, ensuring compliance with technical standards (TSs), and security purposes. Each event logged in an event log file is assigned a unique event ID number, which can be used to retrieve and analyze specific events within a larger set of logs. The event IDs may be defined in one or more Third Generation Partnership Project (3GPP) TSs. Standardization facilitates interoperability for the operators to effectively perform monitoring, troubleshooting, and event correlation across different control plane and user plane NFs including disaggregated deployments and multi-vendor environments. Compliance verification may be performed before a new NF is accepted into wireless network 200 for operations.

Aspects of the disclosure improve the security and resilience of cellular networks at least by assigning, by an NF of a wireless network, to a first mobile communication event, an event ID of a set of event IDs, wherein each event ID within the set of event IDs is unique to a category of mobile communication events and consistent across NFs of the wireless network. With this scheme, mobile communication event IDs may be leveraged for correlation across various NFs provided by multiple vendors to provide a cohesive, comprehensive view of security-related activities. Mobile service providers using this approach will be in a better situation to manage NFs from various vendors at-will, with improved security and flexibility to adapt monitoring and security platforms.

With reference now to the figures, FIG. 1 illustrates an exemplary architecture 100 that advantageously provides global mobile communication event IDs for improved network and security operations. A user equipment (UE) 102 uses a wireless network 200 for a phone call to another UE 106 or to reach a media resource 124 or a network resource 134 (e.g., a website) for a packet data session. UE 102 may be a cellular telephone, such as a smartphone, but may also represent other telecommunication devices capable of using a wireless network, such as a personal computer (PC, e.g., desktop, notebook, tablet, etc.) with a cellular modem, an Internet of Things (IoT) device with a cellular modem, a vehicle with a cellular modem, and others.

Aspects of the disclosure are applicable to wireless networks using any radio access technology (RAT) including further extensions or updated implementations of fifth generation (5G) networks (e.g., 5G Advanced) or next generations of RATs or even wired networks. Wireless network 200 may be a cellular network such as a 5G network, a fourth generation (4G) network, or another cellular generation network. In normal cellular operation, UE 102 uses an air interface 112 to communicate with base station 202 of wireless network 200. In some scenarios, base station 202 may also be referred to as a radio access network (RAN) and may be considered to be an NF. Wireless network 200 has a core network comprising an access node 212, a session management node 214, a packet routing node 216, an other NF 218, and other components (not shown). Access node 212, session management node 214, and packet routing node 216 may each be considered an NF. Other NF 218 may be an authentication server function (AUSF), a network slicing selection function (NSSF), a unified data management node (UDM), or another NF or (virtual NF). Wireless network 200 also has a proxy node 230. Access node 212 and session management node 214 are within a control plane of wireless network 200, and packet routing node 216 is within a user plane of wireless network 200.

Base station 202 is in communication with access node 212 and packet routing node 216. Access node 212 is in communication with session management node 214. Packet routing node 216 is in communication with session management node 214, proxy node 230, and an external data network (DN) 130, such as the internet. In some 5G examples, base stations 202 comprises a gNodeB (gNB), access node 212 comprises an access mobility function (AMF), session management node 214 comprises a session management function (SMF), and packet routing node 216 comprises a user plane function (UPF).

In some 4G examples, base station 202 comprises an eNodeB (eNB), access node 212 comprises a mobility management entity (MME), session management node 214 comprises a system architecture evolution gateway (SAEGW) control plane (SAEGW-C), and packet routing node 216 comprises an SAEGW-user plane (SAEGW-U). In some examples, proxy node 230 comprises a proxy call session control function (P-CSCF) in both 4G and 5G.

In some examples, wireless network 200 has multiple ones of each of the components illustrated, in addition to other components and other connectivity among the illustrated components. In some examples, wireless network 200 has components of multiple cellular technologies operating in parallel in order to provide service to UEs of different cellular generations. In some examples, multiple cells may be co-located at a common cell site, and may be a mix of 5G and 4G.

Proxy node 230 is in communication with an internet protocol (IP) multimedia system (IMS) 120, in order to provide connectivity to other wireless (cellular) networks, for a call with UE 106, or a public switched telephone system (POTS). In some examples, proxy node 230 may be considered to be within IMS 120. UE 102 reaches media resource 124 using IMS 120, and reaches network resource 134 using either DN 130 or IMS 120. Data packets from UE 102 pass through at least base station 202 and packet routing node 216 on their way to external DN 130 or IMS 120 (via proxy node 230).

Figure 2:
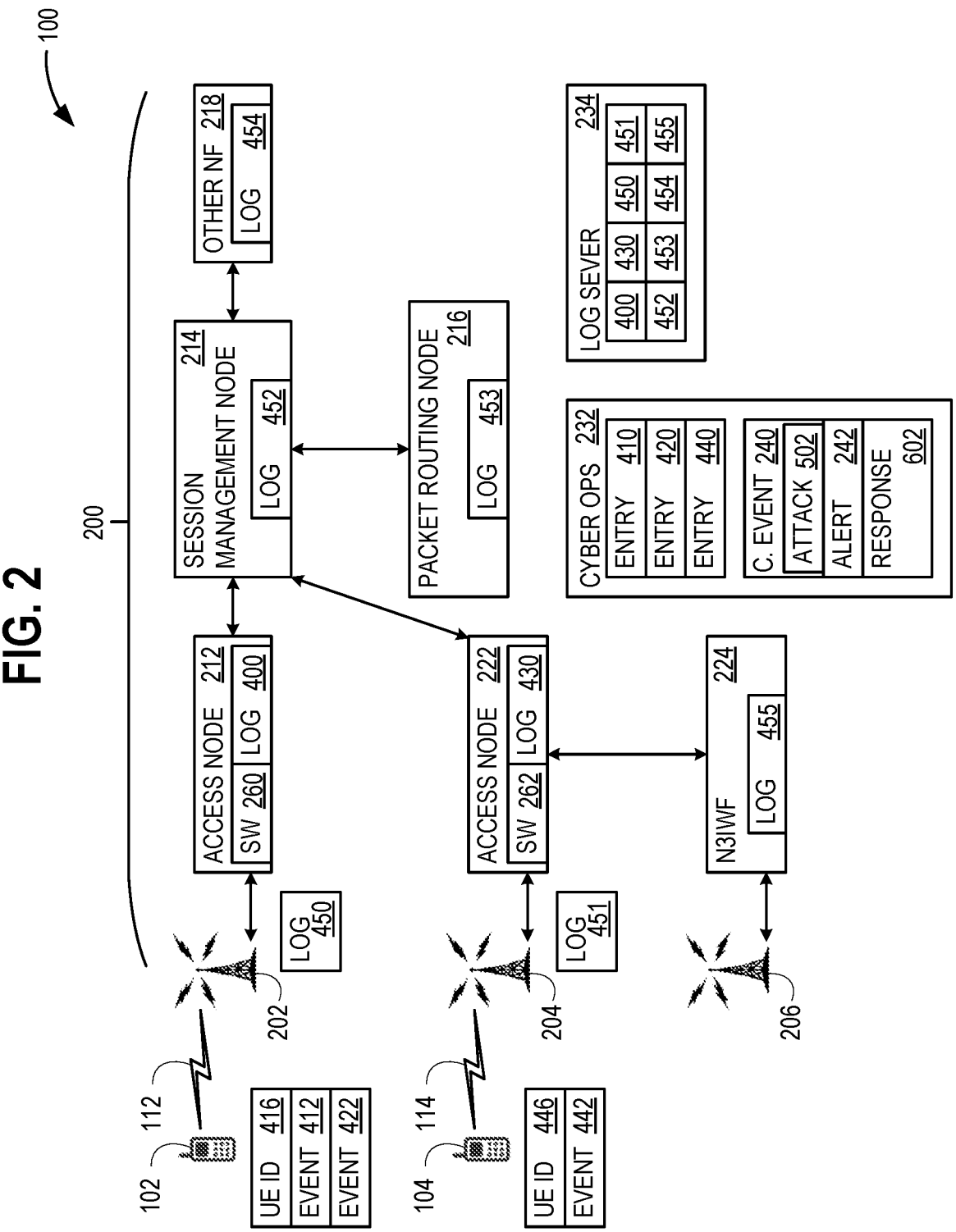
FIG. 2 illustrates further detail for the wireless network in the example architecture of FIG. 1.
Figure 4:
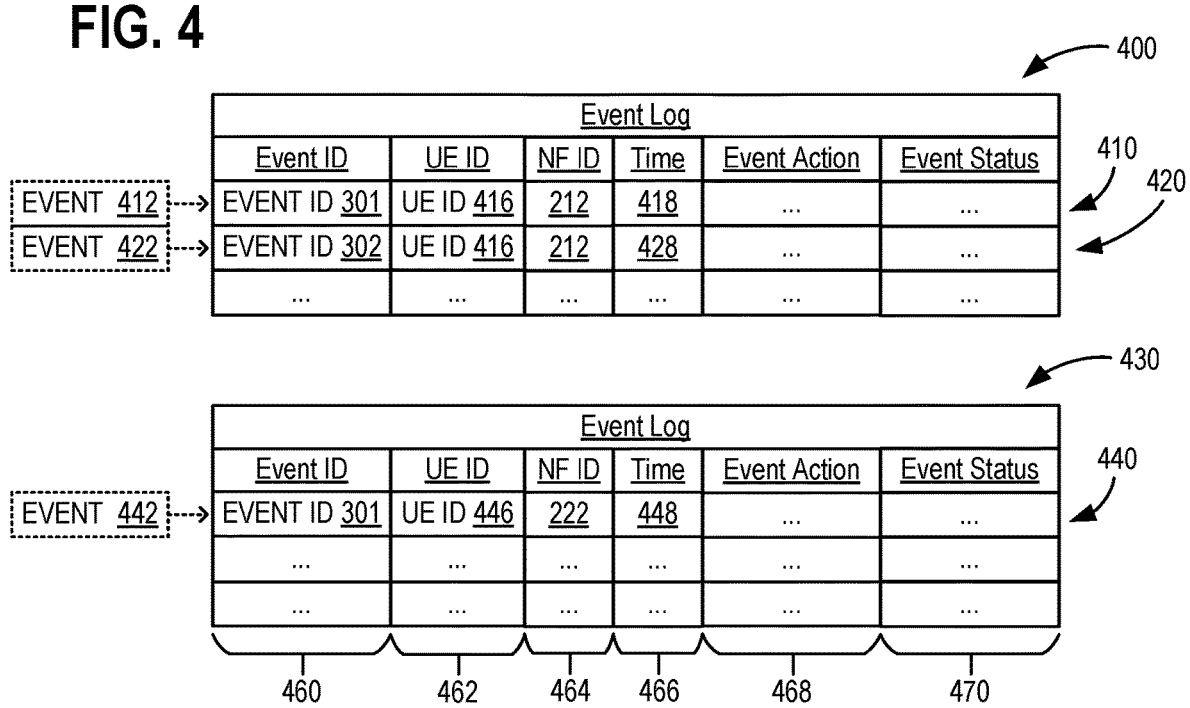
FIG. 4 illustrates event logs, as may be used in examples of the architecture of FIG. 1.

The NFs of wireless network 200 (e.g., base station 202, access node 212, session management node 214, packet routing node 216, and other NF 218) each keeps event logs of mobile communications events (as shown in FIGS. 2 and 4), and provides copies of the event logs to a log server 234. A cybersecurity operations center 232 provides a service that correlates event IDs to identify a near real time and/or real time cybersecurity event and then define the appropriate responses and/or actions to mitigate damage to the wireless network 200.

In some examples, cybersecurity operations center 232 has a set of computational resources that are able to automatically detect and correlate mobile communication events with cybersecurity events. Cybersecurity operations center 232 may have machine learning (ML) models, multi-modal models, or artificial intelligence (AI), which is included within ML, as used herein. The ML capabilities of cybersecurity operations center 232 may leverage advanced algorithms and/or rigid logic that uses standardized event IDs to identify security events.

Cybersecurity operations center 232 receives at least some of the event IDs logged by the NFs of wireless network 200 and audits the event IDs to proactively identify any occurrence of an ongoing cyber attack and/or perform a forensics investigation in the aftermath of a cyber attack.

Cybersecurity operations center 232 is able to transmit alerts and instructions for defensive responses to the NFs of wireless network 200.

FIG. 2 illustrates further detail for NFs of wireless network 200 and data collection of mobile communication events. UE 102 may have a UE Identifier (ID) 416, which is unique to UE 102 and permits differentiation between UE 102 and other UEs, such as UE 106 and a UE 104. UE 104 has its own UE ID 446. In FIG. 2, UE 102 is involved with at least two mobile communication events, including a mobile communication event 412 and a mobile communication event 422. UE 104 is involved with at least one mobile communication event, including a mobile communication event 442.

The occurrences of mobile communication events 412 and 422 are recorded using log entries in an event log 400, as shown in FIG. 4 and described below. The log entries each have an event ID for a respective one of mobile communication events 412 and 422. Event IDs are shown and described in further detail in relation to FIG. 3. Event log 400 is maintained within access node 212, and has a log entries for mobile communication events involving UE 102 (e.g., mobile communication events 412 and 422) because base station 202 is serving UE 102 and connects to access node 212. In some examples, base station 202 has its own event log 450, which may also have log entries for mobile communication events 412 and 422.

UE 102 is served by a base station 204, which connects to an access node 222 that has an event log 430. Base station 204 and access node 222 may each be considered to be an NF of wireless network 200. The occurrence of mobile communication event 442 is recorded using a log entry in event log 430 (also shown in FIG. 4 and described below), because base station 204 is serving UE 104, using an air interface 114, and connects to access node 222. In some examples, base station 204 has its own event log 451, which may also have a log entry for mobile communication event 442.

Other NFs may also have event logs, such as session management node 214 has an event log 452, packet routing node 216 has an event log 453, other NF 218 has an event log 454, and a non-3GPP interworking function (N3IWF) server 224 has an event log 455. N3IWF server 224 provides a gateway to wireless network 200 for non-3GPP UEs, and may also be considered to be an NF of wireless network 200. Each of the NFs of wireless network 200 may execute its own proprietary software, developed by different vendors. For example, access node 212 has proprietary software 260 that may execute differently than proprietary software 262 of access node 222, yet both proprietary software 260 and proprietary software 262 use a consistent set of event IDs for mobile communication events.

Base station 206 represents an access network that includes a non-3GPP customer premises network, such as a local area network (LAN) that offers both wired and wireless connectivity. Non-3GPP UEs may connect using wired connections or wireless access points (WAPs), including technologies like IEEE 802.11 (WiFi) and IEEE 802.15 (Bluetooth) access points, among others. This is an untrusted access network that connects to wireless network 200 using N3IWF server 224 as an interface. It should be understood that aspects of the disclosure are applicable to additional access networks, beyond those that are compliant with 3GPP TSs, such as trusted non-3gpp access networks and gateway functions, trusted wireless LANs (WLANs), and wired access networks (e.g., broadband and cable).

As illustrated, log server 234 had copies of all event logs 400, 430, and 451-455. Cybersecurity operations center 232 may also have copies of the event logs, or may have only certain log entries. A log entry 410 is for mobile communication event 412 and was harvested from event log 400; a log entry 420 is for mobile communication event 422 and was also harvested from event log 400; and a log entry 440 is for mobile communication event 442 and was harvested from event log 430.

Using one or more of log entries 410, 420, and 440, cybersecurity operations center 232 is able to identify the occurrence of a cybersecurity event 240, such as a categorized attack 502 (shown and described in relation to FIG. 5 below), generate an alert 242 for cybersecurity event 240 (in response to detecting cybersecurity event 240), and initiate a cybersecurity event response 602. A cybersecurity event is a superset of a cyber attack, but also includes other activities such as suspicious or improper activities that do not rise to the level of an attack. Cybersecurity event response 602 is performed at one or more nodes of wireless network 200, and may be orchestrated by cybersecurity operations center 232. Examples of cybersecurity event response 602 include de-registering a UE from wireless network 200, and quarantining or otherwise limiting traffic to and from a set of UEs.

There are multiple approaches possible. One approach is that event logs are sent (push or pull) from the NFs directly to cybersecurity operations center 232, which then audits the log entries. Another approach is that event logs are sent (push or pull) from the NFs log server 234, which mines the event logs and sends certain log entries to cybersecurity operations center 232. Yet another approach is that the NFs mine their own event logs event logs and send certain log entries to cybersecurity operations center 232. Other approaches are also possible. The key is that log entries 410, 420, and 440 arrive at cybersecurity operations center 232 for auditing and compliance verification.

Figure 3:
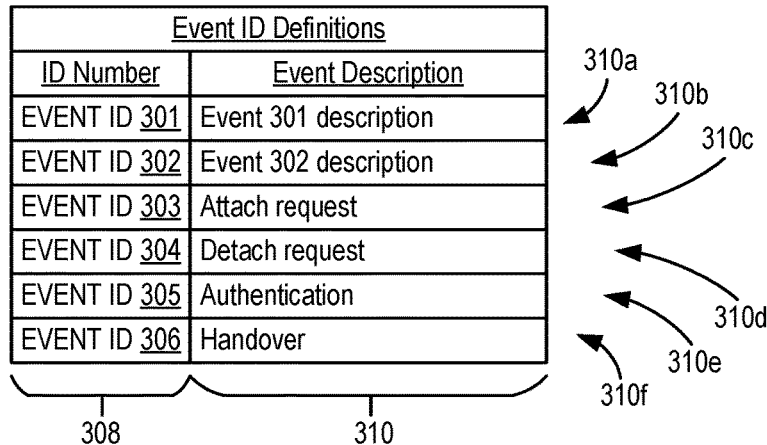
FIG. 3 illustrates further detail for event IDs, as may be used in examples of the architecture of FIG. 1.

FIG. 3 illustrates further detail for event IDs. A set of event IDs 300 has a defined event ID that is unique to each category of mobile communication event. A set of ID numbers 308 is matched against a set of event categories 310, defined with the illustrated descriptions. Set of ID numbers 308 may be numeric only or alphanumeric, in various examples. Set of event categories 310 may include categories such as attach request, detach request, authentication, and handover. The event categories of set of event categories 310 may be defined in 3GPP TSs, along with their corresponding event ID, with definitions providing detailed information about the event, including its purpose, triggering conditions, and any associated parameters or data. A category 310a has event ID 301; a category 310b has event ID 302; a category 310c has event ID 303; a category 310d has event ID 304; a category 310e has event ID 305; and a category 310f has event ID 306.

Not all events will have a UE ID. If an attacker (threat actor) is using a UE to attack wireless network 200, then the associated events should have a UE ID. However, if the attacker has compromised an NF using another connection (e.g., internet connection) and has launched an attack on a second NF, there may not be a UE ID for events associated with that attack.

FIG. 4 illustrates event logs 400 and 430. Event logs 450-455 may be similar. Event logs 400 and 430 are shown with only a few log entries, although it should be understood that event logs in a typical NF may have a large number of log entries. For example, in some scenarios, a single UE may generate, an average, about one log entry per second, a single base station may serve hundreds of UEs simultaneously, and a single access node may support several base stations.

Event logs 450-455 each has an event ID field 460 with event IDs for the logged mobile communication events, possibly a UE ID field 462 with UE IDs of the UEs associated with the logged mobile communication events, an NF ID field 464 identifying the NFs associated with the logged mobile communication events, a timestamp field 466 indicating the event time, an event action field 468, and an event status field 470. The UE IDs may include any of an international mobile equipment identity (IMEI), an international mobile subscriber identity (IMSI), a subscription permanent identifier (SUPI), a network access identifier (NAI), a global unique temporary identifier (GUTI), and/or a subscription concealed identifier (SUCI). Each of a SUPI, an IMSI, an NAI, and an IMEI is permanent, whereas each of a SUCI, a GUTI, and a TMSI may be temporary. In some examples, the UE IDs may include public identifiers, such as a mobile station international subscriber directory number (MSISDN).

Example actions in event action field 468 include forwarded request, denied request, created session, modified bearer, and others. Example status information in event status field 470 includes successful, redirected, forwarded, denied, and others. In some examples, additional data is included in additional fields, such as additional relevant data or parameters associated with the event, depending on the event type and specific context. This may be populated by the mobile operator and/or the vendor as part of any needed additional configuration.

Mobile communication event 412 produces a log entry 410 in event log 400, with event ID 301, UE ID 416, an NF ID indicating access node 212, a timestamp 418, and other information. Mobile communication event 422 produces a log entry 420 in event log 400, with event ID 302, UE ID 416, an NF ID indicating access node 212, a timestamp 428, and other information. Mobile communication event 442 produces a log entry 440 in event log 430, with event ID 301, UE ID 446, an NF ID indicating access node 222, a timestamp 448, and other information. Log entries 410 and 420 have the same UE ID 416 and the same NF ID indicating access node 212, but different event IDs. Log entries 410 and 440 have the same event ID 301, but different UE IDs and different NF IDs, reflecting that they were associated with different UES 102 and 104, being served by different access nodes 212 and 222.

With a comprehensive view of the network, a cyber attack may be detected by noticing a pattern of event IDs associated with a single UE, similar event IDs for different UEs spread across wireless network 200, and a combination.

FIG. 5 illustrates an attack framework with a set of categorized attacks 500. There is a set of attack categories 510 relevant to wireless network 200, and may include categories such as reconnaissance, resource development, initial access, execution, persistence, privilege escalation, defense evasion, credential access, discovery, lateral movement, collection, command and control, (data) exfiltration, impact, and/or other categories of cyber attacks. A set of correlated event IDs 512 lists event IDs that are correlated with each attack category.

Cybersecurity event 240 includes categorized attack 502, which is correlated with set of event IDs 504 (which is a subset of set of event IDs 300). Another categorized attack 510a is correlated with set of event IDs 512a; a categorized attack 510b is correlated with set of event IDs 512b; a categorized attack 510c is correlated with set of event IDs 512c; a categorized attack 510d is correlated with set of event IDs 512d; and a categorized attack 510e is correlated with set of event IDs 512e. Sets of event IDs 512a-512e generally comprise different groupings of event IDs.

Categorized attack 502 is detected (identified, determined to have occurred) because of the presence of event ID 301 and event ID 302 within event log 400. Other categorized attacks may require the presence of certain event IDs across multiple different event logs.

FIG. 6 illustrates a defense framework 600 that has a set of cybersecurity event responses 612 that corresponds to set of attack categories 510 in set of categorized attacks 500. A cybersecurity event response 602 is a technique that has been determined to be effective against categorized attack 502. Similarly, a cybersecurity event response 612a is paired with categorized attack 510a; a cybersecurity event response 612b is paired with categorized attack 510c; a cybersecurity event response 612c is paired with categorized attack 510c; a cybersecurity event response 612d is paired with categorized attack 510d; and a cybersecurity event response 612e is paired with categorized attack 510e. In some examples, defense framework 600 pairs various categorized attack with multiple cybersecurity event responses, based on multiple response approaches being effective at addressing a given categorized attack. Cybersecurity operations center 232 may then need to select from multiple defensive response options.

Figure 7:
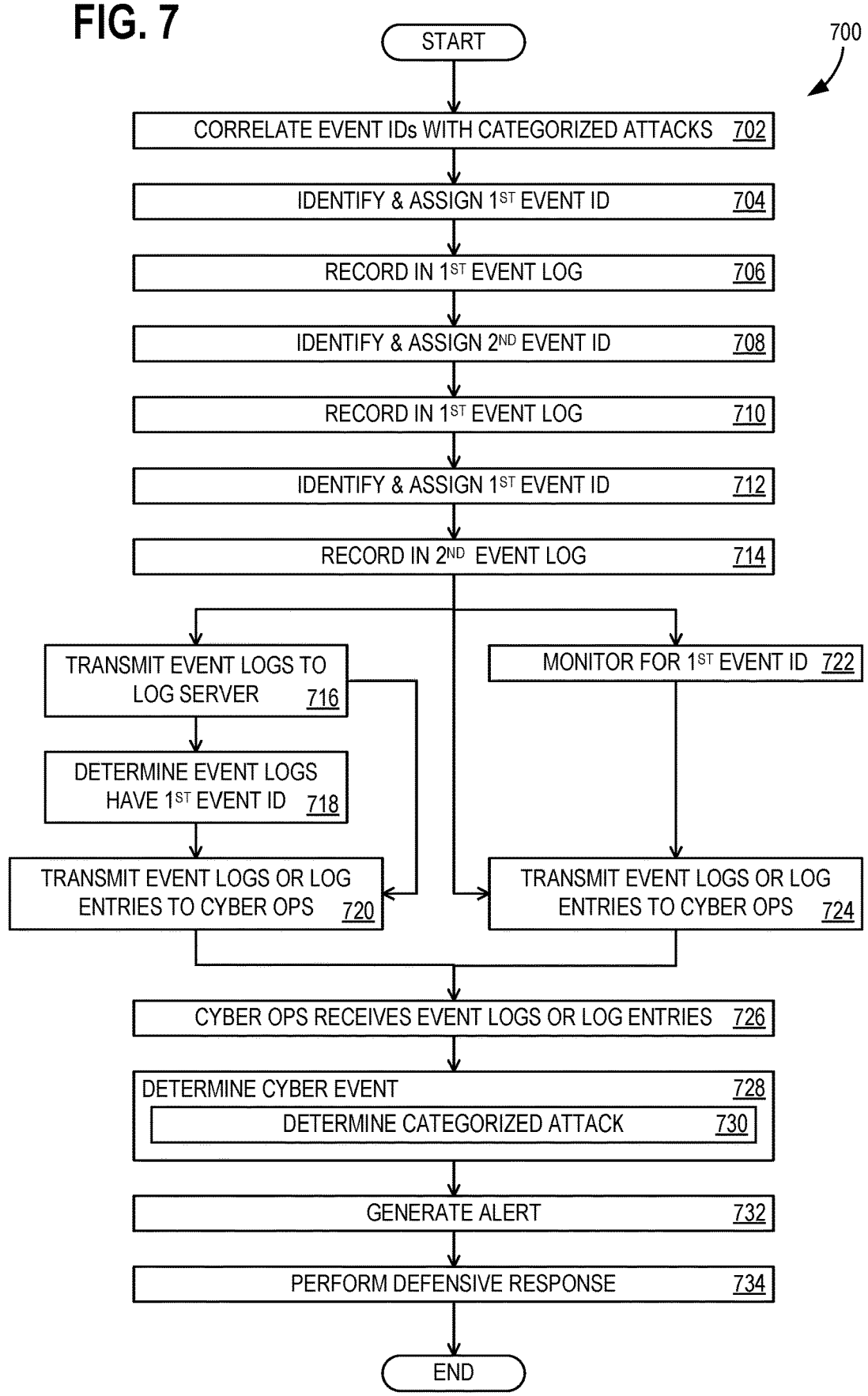
FIGS. 7, 8, and 9 illustrate flowcharts of exemplary operations associated with the architecture of FIG. 1.

FIG. 7 illustrates a flowchart 700 of exemplary operations associated with examples of architecture 100. In some examples, at least a portion of flowchart 700 may be performed using one or more computing devices 1000 of FIG. 10. Flowchart 700 commences with correlating set of event IDs 504 with categorized attack 502 of set of categorized attacks 500, in operation 702. In operation 704, access node 212 (a first NF) identifies the occurrence of mobile communication event 412 and assigns event ID 301 to mobile communication event 412.

Access node 212 records log entry 410, indicating an occurrence of mobile communication event 412, within event log 400 in operation 706. Log entry 410 comprises event ID 301, UE ID 416, and timestamp 418. In operation 708, access node 212 identifies the occurrence of mobile communication event 422 and assigns event ID 302 to mobile communication event 422. Access node 212 records log entry 420, indicating an occurrence of mobile communication event 422, within event log 400 in operation 710. Log entry 420 comprises event ID 302, UE ID 416, and timestamp 428.

Access node 222 (a second NF) identifies the occurrence of mobile communication event 442 and assigns event ID 301 to mobile communication event 442 in operation 712. Mobile communication event 412 and mobile communication event 442 are within a common category of mobile communication events. Access node 212 and access node 222 execute different proprietary software, in some examples of architecture 100. In operation 714, access node 222 records log entry 440 within event log 430 at access node 222. Log entry 440 comprises event ID 301, UE ID 446, and timestamp 448.

In some modes of operations, access node 212 transmits event log 400 to log server 234 and access node 222 transmits event log 430 to log server 234 in operation 716 (e.g., using either a push operation or a pull from log server 234). In some modes of operation, flowchart 700 then moves directly to operation 720, which is described below. In some modes of operation, flowchart 700 instead moves to operation 718, in which log server 234 determines that event log 400 and event log 430 each comprises event ID 301. Flowchart 700 then moves to operation 720 contingent upon this determination. Log server 234 transmits log entry 410 and log entry 420 (or event log 400 and event log 430) to cybersecurity operations center 232. Flowchart 700 then moves to operation 726.

In some modes of operation, flowchart 700 instead moves to operation 722 after operation 714. In operation 722, access node 212 monitors event log 400 for certain event IDs, such as event ID 301 and/or event ID 302, and access node 222 monitors event log 430 for certain event IDs, such as event ID 301 and/or event ID 302. Based upon detecting event ID 301 and/or event ID 302, flowchart 700 then moves to operation 724.

In some modes of operation, flowchart 700 moves directly to operation 724 after operation 714, without requiring detection of any specific event IDs. In operation 724, access node 212 transmits log entry 410 and log entry 420 (or the entirety of event log 400) to cybersecurity operations center 232, and access node 222 transmits log entry 440 (or the entirety of event log 430) to cybersecurity operations center 232 (e.g., using either a push operation or a pull from cybersecurity operations center 232). In a pull operation, the transmission of log entries or logs is in response to a request for the log entries or logs from the recipient. In some examples, an agent based solution that performs real-time monitoring of the logs as events are recorded and pulls the logs or log entries for transmission upon some criteria.

Cybersecurity operations center 232 receives log entry 410, log entry 420, and log entry 440 (or event logs 400 and 430) in operation 726. In some modes of operation, cybersecurity operations center 232 receives log entries 410, 420 and 440 in response to an NF or log server 234 detecting an indication of a cybersecurity event, although in some modes of operation, cybersecurity operations center 232 receives log entries 410, 420 and 440 without any node of wireless network 200 detecting an indication of a cybersecurity event.

In operation 728, cybersecurity operations center 232 (or another node of wireless network 200) detects (determines an occurrence of cybersecurity event 240), based on at least event ID 301 and/or event ID 302. In some examples, operation 728 includes operation 730, which determining an occurrence of (detects) categorized attack 502, based on at least event ID 301 and event ID 302.

In operation 732, cybersecurity operations center 232 generates alert 242, based on at least determining cybersecurity event 240 or categorized attack 502. In operation 734, based on at least determining the occurrence of cybersecurity event 240, wireless network performs cybersecurity event response 602.

Figure 8:
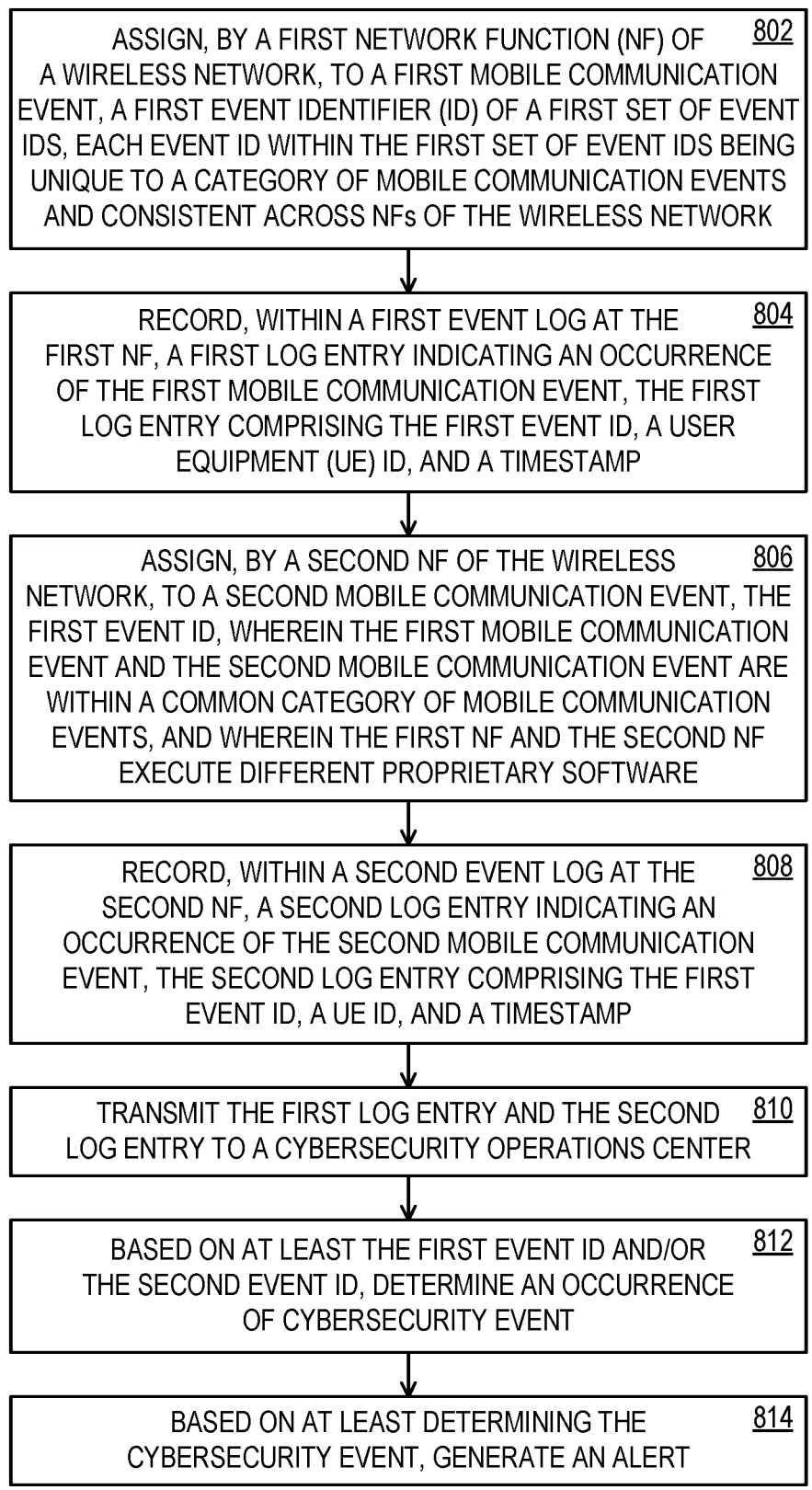

FIG. 8 illustrates a flowchart 800 of exemplary operations associated with examples of architecture 100. In some examples, at least a portion of flowchart 800 may be performed using one or more computing devices 1000 of FIG. 10. Flowchart 800 commences with operation 802, which includes assigning, by a first NF of a wireless network, to a first mobile communication event, a first event ID of a first set of event IDs, each event ID within the first set of event IDs being unique to a category of mobile communication events and consistent across NFs of the wireless network.

Operation 804 includes recording, within a first event log at the first NF, a first log entry indicating an occurrence of the first mobile communication event, the first log entry comprising the first event ID and a timestamp. Operation 806 includes assigning, by a second NF of the wireless network, to a second mobile communication event, the first event ID, wherein the first mobile communication event and the second mobile communication event are within a common category of mobile communication events, and wherein the first NF and the second NF execute different proprietary software.

Operation 808 includes recording, within a second event log at the second NF, a second log entry indicating an occurrence of the second mobile communication event, the second log entry comprising the first event ID and a timestamp. Operation 810 includes transmitting the first log entry and the second log entry to a cybersecurity operations center. Operation 812 includes, based on at least the first event ID and/or the second event ID, determining an occurrence of a cybersecurity event. Operation 814 includes, based on at least determining the cybersecurity event, generating an alert.

Figure 9:
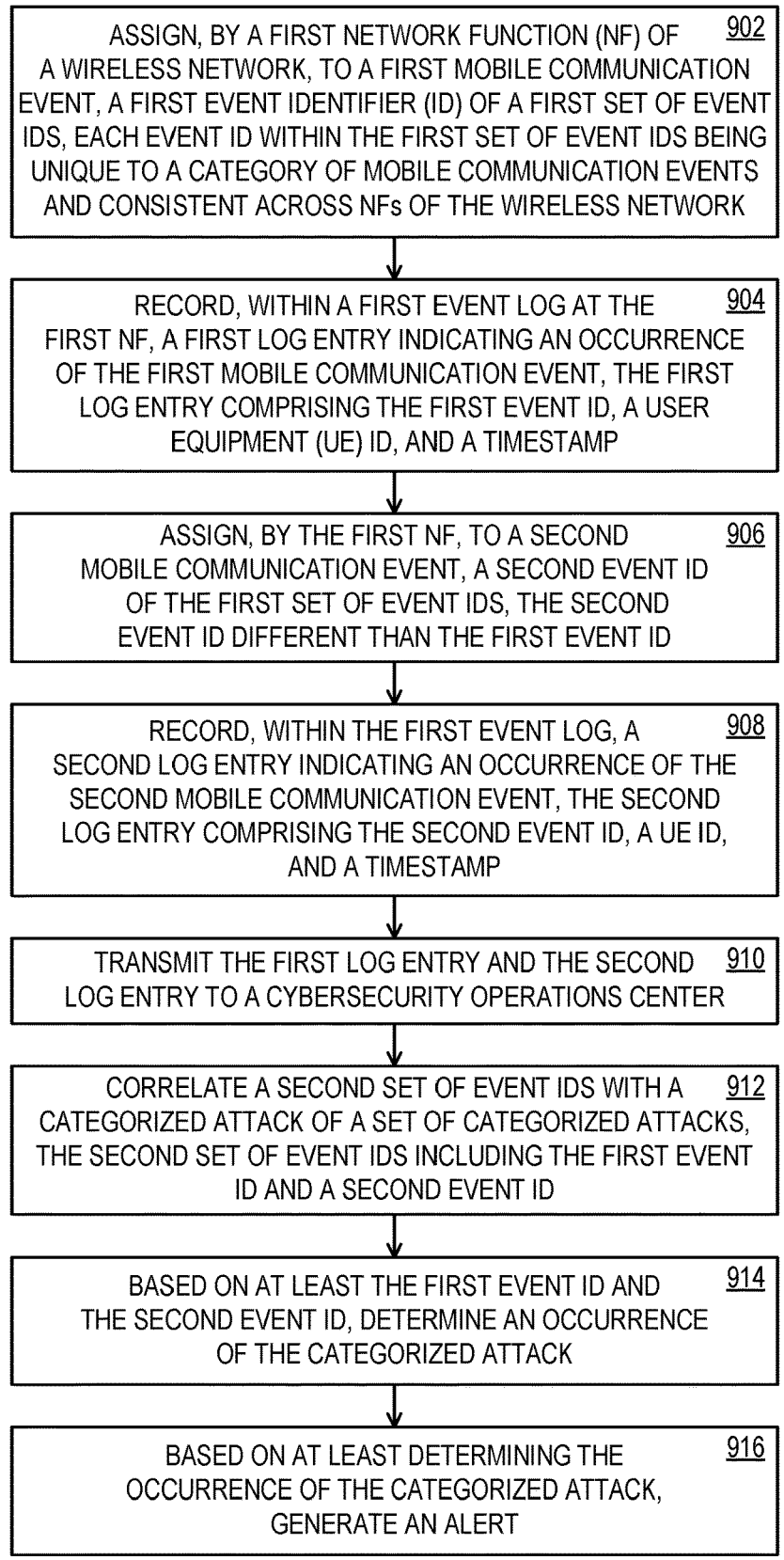

FIG. 9 illustrates a flowchart 900 of exemplary operations associated with examples of architecture 100. In some examples, at least a portion of flowchart 900 may be performed using one or more computing devices 1000 of FIG. 10. Flowchart 900 commences with operation 902, which includes assigning, by a first NF of a wireless network, to a first mobile communication event, a first event ID of a first set of event IDs, each event ID within the first set of event IDs being unique to a category of mobile communication events and consistent across NFs of the wireless network.

Operation 904 includes recording, within a first event log at the first NF, a first log entry indicating an occurrence of the first mobile communication event, the first log entry comprising the first event ID and a timestamp. Operation 906 includes assigning, by the first NF, to a second mobile communication event, a second event ID of the first set of event IDs, the second event ID different than the first event ID. Operation 908 includes recording, within the first event log, a second log entry indicating an occurrence of the second mobile communication event, the second log entry comprising the second event ID and a timestamp.

Operation 910 includes transmitting the first log entry and the second log entry to a cybersecurity operations center. Operation 912 includes correlating a second set of event IDs with a categorized attack of a set of categorized attacks, the second set of event IDs including the first event ID and a second event ID. Operation 914 includes, based on at least the first event ID and the second event ID, determining an occurrence of the categorized attack. Operation 916 includes, based on at least determining the occurrence of the categorized attack, generating an alert.

Figure 10:
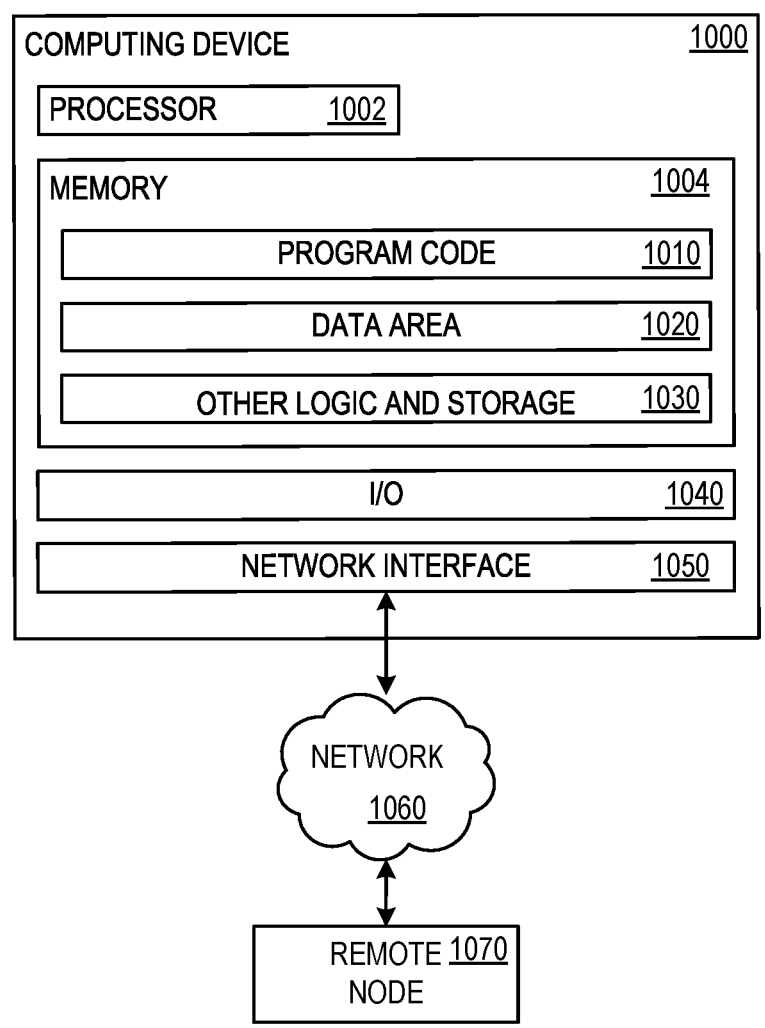
FIG. 10 illustrates a block diagram of a computing device suitable for implementing various aspects of the disclosure.

FIG. 10 illustrates a block diagram of computing device 1000 that may be used as any component described herein that may require computational or storage capacity. Computing device 1000 has at least a processor 1002 and a memory 1004 that holds program code 1010, data area 1020, and other logic and storage 1030. Memory 1004 is any device allowing information, such as computer executable instructions and/or other data, to be stored and retrieved. For example, memory 1004 may include one or more random access memory (RAM) modules, flash memory modules, hard disks, solid-state disks, persistent memory devices, and/or optical disks. Program code 1010 comprises computer executable instructions and computer executable components including instructions used to perform operations described herein. Data area 1020 holds data used to perform operations described herein. Memory 1004 also includes other logic and storage 1030 that performs or facilitates other functions disclosed herein or otherwise required of computing device 1000. An input/output (I/O) component 1040 facilitates receiving input from users and other devices and generating displays for users and outputs for other devices. A network interface 1050 permits communication over external network 1060 with a remote node 1070, which may represent another implementation of computing device 1000. For example, a remote node 1070 may represent another of the above-noted nodes within architecture 100.

Additional Examples

An example system comprises: a processor; and a computer-readable medium storing instructions that are operative upon execution by the processor to: assign, by a first NF of a wireless network, to a first mobile communication event, a first event ID of a first set of event IDs, each event ID within the first set of event IDs being unique to a category of mobile communication events and consistent across NFs of the wireless network; record, within a first event log at the first NF, a first log entry indicating an occurrence of the first mobile communication event, the first log entry comprising the first event ID, and a timestamp; assign, by a second NF of the wireless network, to a second mobile communication event, the first event ID, wherein the first mobile communication event and the second mobile communication event are within a common category of mobile communication events, and wherein the first NF and the second NF execute different proprietary software; record, within a second event log at the second NF, a second log entry indicating an occurrence of the second mobile communication event, the second log entry comprising the first event ID and a timestamp; transmit the first log entry and the second log entry to a cybersecurity operations center; based on at least the first event ID and/or the second event ID, determine an occurrence of cybersecurity event; and based on at least determining the cybersecurity event, generate an alert.

An example method comprises: assigning, by a first NF of a wireless network, to a first mobile communication event, a first event ID of a first set of event IDs, each event ID within the first set of event IDs being unique to a category of mobile communication events and consistent across NFs of the wireless network; recording, within a first event log at the first NF, a first log entry indicating an occurrence of the first mobile communication event, the first log entry comprising the first event ID and a timestamp; assigning, by a second NF of the wireless network, to a second mobile communication event, the first event ID, wherein the first mobile communication event and the second mobile communication event are within a common category of mobile communication events, and wherein the first NF and the second NF execute different proprietary software; recording, within a second event log at the second NF, a second log entry indicating an occurrence of the second mobile communication event, the second log entry comprising the first event ID and a timestamp; transmitting the first log entry and the second log entry to a cybersecurity operations center; based on at least the first event ID and/or the second event ID, determining an occurrence of a cybersecurity event; and based on at least determining the cybersecurity event, generating an alert.

One or more example computer storage devices has computer-executable instructions stored thereon, which, upon execution by a computer, cause the computer to perform operations comprising: assigning, by a first NF of a wireless network, to a first mobile communication event, a first event ID of a first set of event IDs, each event ID within the first set of event IDs being unique to a category of mobile communication events and consistent across NFs of the wireless network; recording, within a first event log at the first NF, a first log entry indicating an occurrence of the first mobile communication event, the first log entry comprising the first event ID and a timestamp; assigning, by a second NF of the wireless network, to a second mobile communication event, the first event ID, wherein the first mobile communication event and the second mobile communication event are within a common category of mobile communication events, and wherein the first NF and the second NF execute different proprietary software; recording, within a second event log at the second NF, a second log entry indicating an occurrence of the second mobile communication event, the second log entry comprising the first event ID and a timestamp; transmitting the first log entry and the second log entry to a cybersecurity operations center; based on at least the first event ID and/or the second event ID, determining an occurrence of a cybersecurity event; and based on at least determining the cybersecurity event, generating an alert.

Another example method comprises: assigning, by a first NF of a wireless network, to a first mobile communication event, a first event ID of a first set of event IDs, each event ID within the first set of event IDs being unique to a category of mobile communication events and consistent across NFs of the wireless network; recording, within a first event log at the first NF, a first log entry indicating an occurrence of the first mobile communication event, the first log entry comprising the first event ID and a timestamp; assigning, by the first NF, to a second mobile communication event, a second event ID of the first set of event IDs, the second event ID different than the first event ID; recording, within the first event log, a second log entry indicating an occurrence of the second mobile communication event, the second log entry comprising the second event ID and a timestamp; transmitting the first log entry and the second log entry to a cybersecurity operations center; correlating a second set of event IDs with a categorized attack of a set of categorized attacks, the second set of event IDs including the first event ID and a second event ID; based on at least the first event ID and the second event ID, determining an occurrence of the categorized attack; and based on at least determining the occurrence of the categorized attack, generating an alert.

Alternatively, or in addition to the other examples described herein, examples include any combination of the following:
 based on at least determining the occurrence of the cybersecurity event, performing a cybersecurity event response;
 correlating a second set of event IDs with a categorized attack of a set of categorized attacks;
 the second set of event IDs includes the first event ID and a second event ID;
 the second event ID is different than the first event ID;
 receiving, by the cybersecurity operations center, a third log entry comprising the second event ID of the first set of event IDs;
 determining the occurrence of the cybersecurity event comprises determining an occurrence of the categorized attack;
 transmitting, by the first NF, to the cybersecurity operations center, the first event log;
 transmitting, by the second NF, to the cybersecurity operations center, the second event log;
 transmitting, by the first NF, to a log server, the first event log;

transmitting, by the second NF, to the log server, the second event log;
determining, by the log server, that the first event log and the second event log each comprises the first event ID;
based on at least determining that the first event log and the second event log each comprises the first event ID, transmitting, by the log server, to the cybersecurity operations center, the first event log and the second event log;
monitoring, by the first NF, for an occurrence of the first event ID;
the first NF transmits the first log entry based on at least detecting the occurrence of the first event ID;
monitoring, by the second NF, for an occurrence of the first event ID;
the second NF transmits the second log entry based on at least detecting the occurrence of the first event ID;
detecting an indication of a categorized attack;
transmitting the first log entry and the second log entry to the cybersecurity operations center is based on at least detecting the indication of the categorized attack;
identifying, by the first NF, the occurrence of the first mobile communication event;
identifying, by the second NF, the occurrence of the second mobile communication event;
the first NF and the second NF execute different proprietary software;
the first NF and the second NF execute have different manufacturers;
the UE ID comprises an IMEI, an IMSI, an SUPI, a NAI, a GUTI, and/or a SUCI;
the set of event IDs has an event ID for each event category of the list consisting of: initial IE message, attach request, detach request, authentication, and handover;
the first log entry and the second log entry each further comprises: an event category, an NF ID, an event action, and/or event status;
each event ID in the set of event IDs is numeric only or alphanumeric;
the third log entry is within the first event log or the second event log;
the cybersecurity operations center does not receive the entirety of the first event log or the entirety of the second event log;
the UE ID in the first log entry matches the UE ID in the second log entry;
the UE ID in the first log entry does not match the UE ID in the second log entry; and
the first NF and the second NF is each any of: a gNB, an eNB, an AUSF, an NSSF, an AMF, an SMF, a UPF, a UDM, and an N3IWF server.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements.

The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:
    assigning, by a first network function (NF) of a wireless network, to a first mobile communication event, a first event identifier (ID) of a first set of event IDs, each event ID within the first set of event IDs being unique to a category of mobile communication events and consistent across NFs of the wireless network;
    recording, within a first event log at the first NF, a first log entry indicating an occurrence of the first mobile communication event, the first log entry comprising the first event ID and a timestamp;
    assigning, by a second NF of the wireless network, to a second mobile communication event, the first event ID, wherein the first mobile communication event and the second mobile communication event are within a common category of mobile communication events, and wherein the first NF and the second NF execute different proprietary software;
    recording, within a second event log at the second NF, a second log entry indicating an occurrence of the second mobile communication event, the second log entry comprising the first event ID and a timestamp;
    transmitting the first log entry and the second log entry to a cybersecurity operations center;
    based on at least the first event ID and/or the second event ID, determining an occurrence of a cybersecurity event;
    based on at least determining the cybersecurity event, generating an alert;
    correlating a second set of event IDs with a categorized attack of a set of categorized attacks, the second set of event IDs including the first event ID and a second event ID, the second event ID different than the first event ID; and
    receiving, by the cybersecurity operations center, a third log entry comprising the second event ID of the first set of event IDs, wherein determining the occurrence of the cybersecurity event comprises determining an occurrence of the categorized attack.

2. The method of claim 1, further comprising:
    based on at least determining the occurrence of the cybersecurity event, performing a cybersecurity event response.

3. The method of claim 1, further comprising:
    transmitting, by the first NF, to the cybersecurity operations center, the first event log; and
    transmitting, by the second NF, to the cybersecurity operations center, the second event log.

4. The method of claim 1, further comprising:
    transmitting, by the first NF, to a log server, the first event log;
    transmitting, by the second NF, to the log server, the second event log;

determining, by the log server, that the first event log and the second event log each comprises the first event ID; and based on at least determining that the first event log and the second event log each comprises the first event ID, transmitting, by the log server, to the cybersecurity operations center, the first event log and the second event log.

5. The method of claim 1, further comprising:

monitoring, by the first NF, for an occurrence of the first event ID, wherein the first NF transmits the first log entry based on at least detecting the occurrence of the first event ID; and monitoring, by the second NF, for an occurrence of the first event ID, wherein the second NF transmits the second log entry based on at least detecting the occurrence of the first event ID.

6. The method of claim 1, further comprising:

detecting an indication of a categorized attack, wherein transmitting the first log entry and the second log entry to the cybersecurity operations center is based on at least detecting the indication of the categorized attack.

7. A system comprising:

a processor; and a computer-readable medium storing instructions that are operative upon execution by the processor to:

assign, by a first network function (NF) of a wireless network, to a first mobile communication event, a first event identifier (ID) of a first set of event IDs, each event ID within the first set of event IDs being unique to a category of mobile communication events and consistent across NFs of the wireless network;

record, within a first event log at the first NF, a first log entry indicating an occurrence of the first mobile communication event, the first log entry comprising the first event ID and a timestamp;

assign, by a second NF of the wireless network, to a second mobile communication event, the first event ID, wherein the first mobile communication event and the second mobile communication event are within a common category of mobile communication events, and wherein the first NF and the second NF execute different proprietary software;

record, within a second event log at the second NF, a second log entry indicating an occurrence of the second mobile communication event, the second log entry comprising the first event ID and a timestamp;

transmit the first log entry and the second log entry to a cybersecurity operations center;

based on at least the first event ID and/or the second event ID, determine an occurrence of cybersecurity event;

based on at least determining the cybersecurity event, generating an alert;

correlate a second set of event IDs with a categorized attack of a set of categorized attacks, the second set of event IDs including the first event ID and a second event ID, the second event ID different than the first event ID; and receive, by the cybersecurity operations center, a third log entry comprising the second event ID of the first set of event IDs, wherein determining the occurrence of the cybersecurity event comprises determining an occurrence of the categorized attack.

8. The system of claim 7, wherein the operations are further operative to:

based on at least determining the occurrence of the cybersecurity event, perform a cybersecurity event response.

9. The system of claim 7, wherein the operations are further operative to:

transmit, by the first NF, to the cybersecurity operations center, the first event log; and transmit, by the second NF, to the cybersecurity operations center, the second event log.

10. The system of claim 7, wherein the operations are further operative to:

transmit, by the first NF, to a log server, the first event log; transmit, by the second NF, to the log server, the second event log;

determine, by the log server, that the first event log and the second event log each comprises the first event ID; and based on at least determining that the first event log and the second event log each comprises the first event ID, transmit, by the log server, to the cybersecurity operations center, the first event log and the second event log.

11. The system of claim 7, wherein the operations are further operative to:

monitor, by the first NF, for an occurrence of the first event ID, wherein the first NF transmits the first log entry based on at least detecting the occurrence of the first event ID; and monitor, by the second NF, for an occurrence of the first event ID, wherein the second NF transmits the second log entry based on at least detecting the occurrence of the first event ID.

12. The system of claim 7, wherein the operations are further operative to:

detect an indication of a categorized attack, wherein transmitting the first log entry and the second log entry to the cybersecurity operations center is based on at least detecting the indication of the categorized attack.

13. One or more computer storage devices having computer-executable instructions stored thereon, which, upon execution by a computer, cause the computer to perform operations comprising:

assigning, by a first network function (NF) of a wireless network, to a first mobile communication event, a first event identifier (ID) of a first set of event IDs, each event ID within the first set of event IDs being unique to a category of mobile communication events and consistent across NFs of the wireless network;

recording, within a first event log at the first NF, a first log entry indicating an occurrence of the first mobile communication event, the first log entry comprising the first event ID and a timestamp;

assigning, by a second NF of the wireless network, to a second mobile communication event, the first event ID, wherein the first mobile communication event and the second mobile communication event are within a common category of mobile communication events, and wherein the first NF and the second NF execute different proprietary software;

recording, within a second event log at the second NF, a second log entry indicating an occurrence of the second mobile communication event, the second log entry comprising the first event ID and a timestamp;

transmitting the first log entry and the second log entry to a cybersecurity operations center;

based on at least the first event ID and/or the second event ID, determining an occurrence of a cybersecurity event;

based on at least determining the cybersecurity event, generating an alert;

correlating a second set of event IDs with a categorized attack of a set of categorized attacks, the second set of event IDs including the first event ID and a second event ID, the second event ID different than the first event ID; and receiving, by the cybersecurity operations center, a third log entry comprising the second event ID of the first set of event IDs, wherein determining the occurrence of the cybersecurity event comprises determining an occurrence of the categorized attack.

14. The one or more computer storage devices of claim 13, wherein the operations further comprise:

based on at least determining the occurrence of the cybersecurity event, performing a cybersecurity event response.

15. The one or more computer storage devices of claim 13, wherein the operations further comprise:

transmitting, by the first NF, to the cybersecurity operations center, the first event log; and transmitting, by the second NF, to the cybersecurity operations center, the second event log.

16. The one or more computer storage devices of claim 13, wherein the operations further comprise:

transmitting, by the first NF, to a log server, the first event log;

transmitting, by the second NF, to the log server, the second event log;

determining, by the log server, that the first event log and the second event log each comprises the first event ID; and based on at least determining that the first event log and the second event log each comprises the first event ID, transmitting, by the log server, to the cybersecurity operations center, the first event log and the second event log.

17. The one or more computer storage devices of claim 13, wherein the operations further comprise:

monitoring, by the first NF, for an occurrence of the first event ID, wherein the first NF transmits the first log entry based on at least detecting the occurrence of the first event ID; and monitoring, by the second NF, for an occurrence of the first event ID, wherein the second NF transmits the second log entry based on at least detecting the occurrence of the first event ID.

* * * * *